(12) United States Patent
Kelley

(10) Patent No.: US 11,771,244 B2
(45) Date of Patent: Oct. 3, 2023

(54) SYSTEM FOR SUSPENDING ARTICLES FROM A SURFACE

(71) Applicant: K4 Enterprises, LLC, Grand Island, NE (US)

(72) Inventor: Todd Kelley, Grand Island, NE (US)

( * ) Notice: Subject to any disclaimer, the term of this patent is extended or adjusted under 35 U.S.C. 154(b) by 0 days.

(21) Appl. No.: 17/470,830

(22) Filed: Sep. 9, 2021

(65) Prior Publication Data

US 2022/0071416 A1 Mar. 10, 2022

Related U.S. Application Data

(60) Provisional application No. 63/076,196, filed on Sep. 9, 2020.

(51) Int. Cl.
*F16M 13/02* (2006.01)
*A47G 1/16* (2006.01)

(52) U.S. Cl.
CPC ............... *A47G 1/16* (2013.01); *F16M 13/02* (2013.01)

(58) Field of Classification Search
CPC ............. F16M 13/02; A47G 1/16; B66C 1/62
USPC ................... 248/475.1, 490, 339, 447.1, 489
See application file for complete search history.

(56) References Cited

U.S. PATENT DOCUMENTS

| 4,863,135 | A  | * | 9/1989 | Mellor ..................... A47G 1/18 248/328 |
| 6,508,450 | B2 | * | 1/2003 | Hayde ................. A47G 1/1626 248/498 |
| 9,909,262 | B1 | * | 3/2018 | Garcia ...................... B66C 1/62 |
| 10,290,238 | B1 | * | 5/2019 | Mitchell ................. F16B 9/054 |
| 10,570,948 | B1 | * | 2/2020 | Leslie .................... A47G 25/08 |
| 11,268,633 | B2 | * | 3/2022 | Allender-Zivic ......... F16L 3/06 |

* cited by examiner

*Primary Examiner* — Todd M Epps
(74) *Attorney, Agent, or Firm* — Suiter Swantz pc llo

(57) ABSTRACT

A system for suspending articles from a surface may include, but is not limited to: a line; a first connector including: a curved portion; and a line-retention portion configured to couple to a first end of the line; a second connector including: a curved portion; and a line-retention portion configured to couple to a second end of the line.

6 Claims, 6 Drawing Sheets

SYSTEM FOR SUSPENDING ARTICLES FROM A SURFACE

FIELD OF THE INVENTION

The invention relates generally to the field suspending articles such as framed photos, artwork, decorations or any other wall mounted product from a surface such as a wall.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The advantages of the present invention will become readily apparent from the detailed description of various embodiments below.

Figure 1:
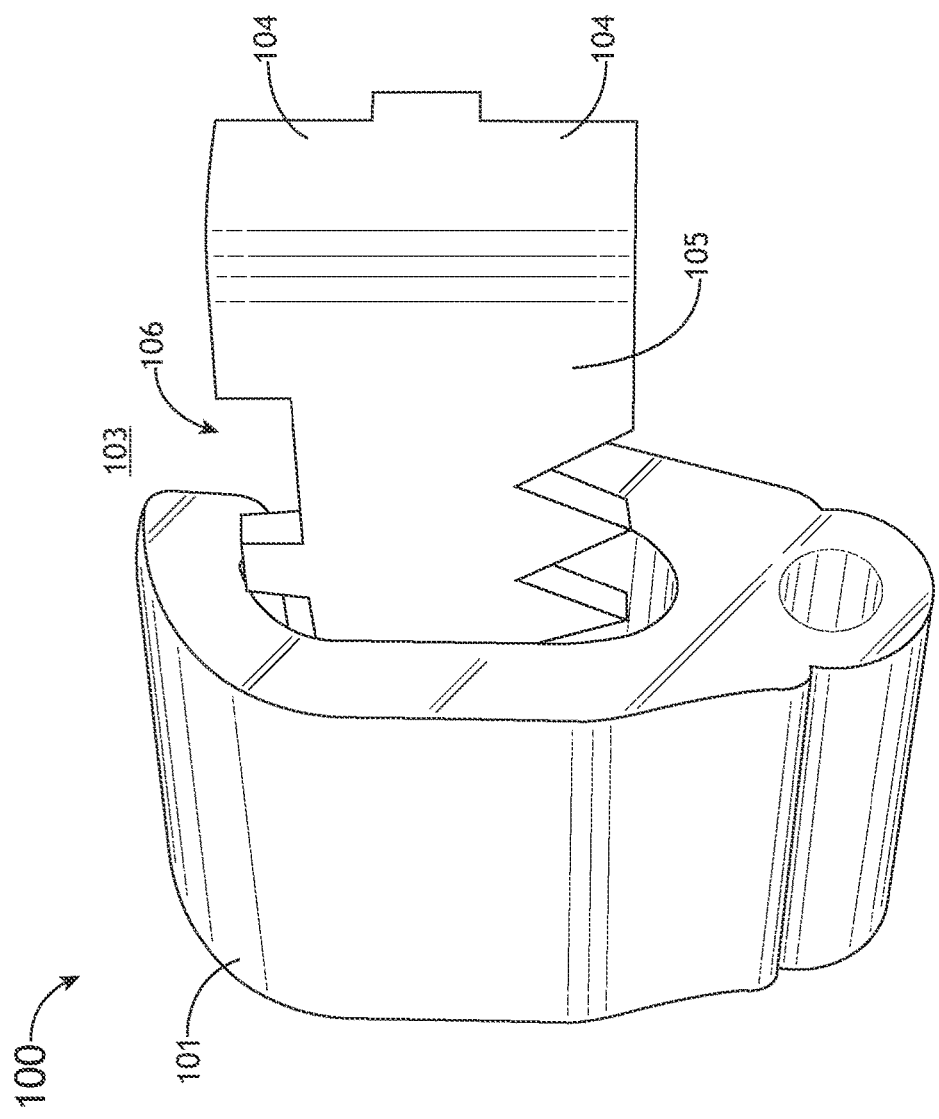
FIG. 1 shows a system for suspending articles from a surface.

Referring to FIG. 1, a system 100 for suspending articles is shown. The system 100 may include at least one connector 101 configured to engage an support bracket 102 affixed to an surface 103 of an article (e.g. a framed photo or picture). The support bracket 102 may have a first portion 104 configured to extend at least partially away (e.g. laterally away) from the surface 103. The support bracket 102 may further including a second portion 105 disposed at an angle (e.g. a right angle) relative to the first portion 104 so as to form a free space 106 between the surface 103 and the second portion 105. In one embodiment, the support bracket 102 may be a sawtooth-type picture hanger.

Figure 2:
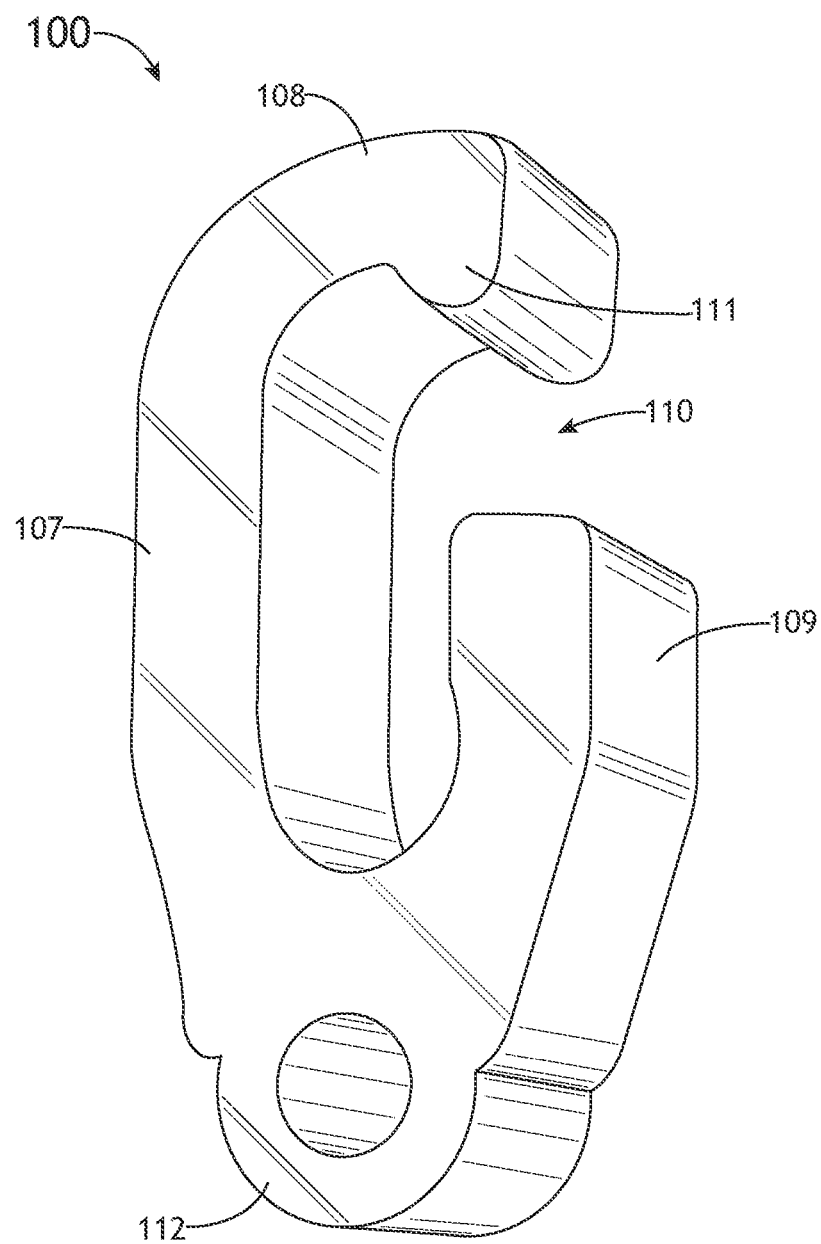
FIG. 2 shows a connector for suspending articles from a surface.

Referring to FIG. 2, the connector 101 may include a body portion 107. The body portion 107 may be generally C-shaped having a first curved portion 108 and a second curved portion 109. The first curved portion 108 and the second curved portion 109 may form an opening 110 through which the second portion 105 of the support bracket 102 may be routed (as described below). In one embodiment, the first curved portion 108 may define a ridge 111 configured to retain the connector 101 in position relative to the support bracket 102 when the connector 101 is affixed to the support bracket 102.

Figure 3:
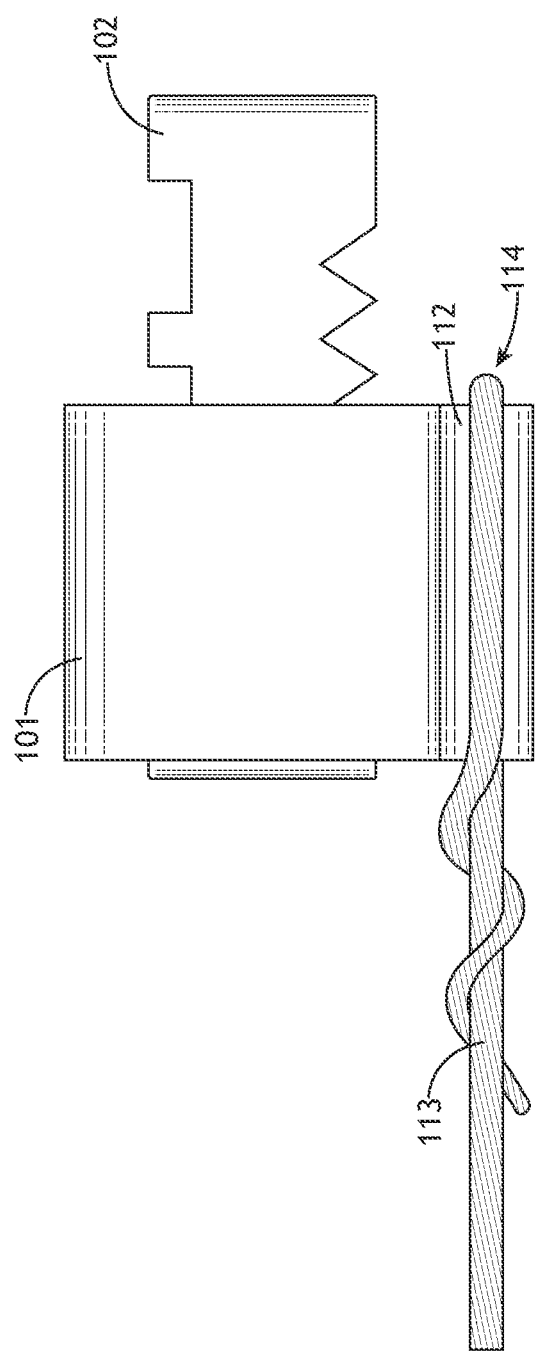
FIG. 3 shows a system for suspending articles from a surface.

In further reference to FIGS. 2 and 3, the connector 101 may include a line retention portion 112 configured to couple a line 113 (e.g. a wire, plastic filament, string, thread, and the like) to the connector 101. In one embodiment, the line retention portion 112 may include an aperture 114 (e.g. a cylindrical aperture) disposed in the connector 101 through which line 113 may be routed. The line 113 may then be clipped, tied, wound, crimped or otherwise retained so as to affix the line to the connector 101.

Figure 4:
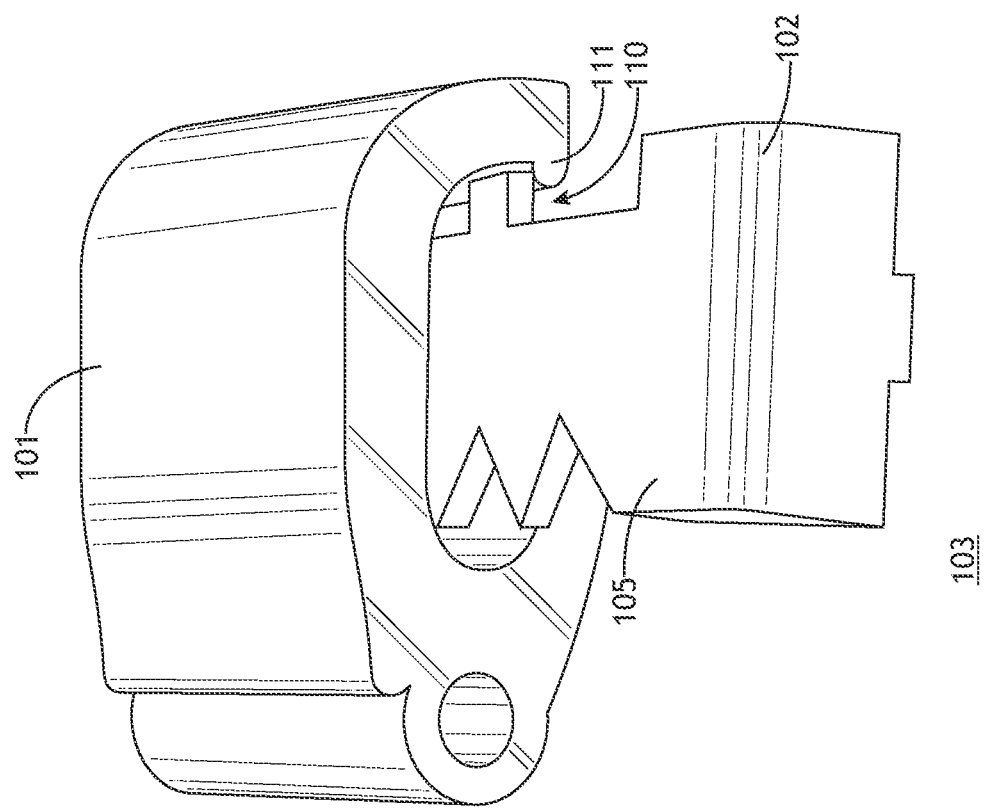
FIG. 4 shows a system for suspending articles from a surface.

Referring to FIG. 4, the connector 101 may be dimensioned such that, when the support bracket 102 is routed into the opening 110 of the connector 101, the ridge 111 of the first curved portion 108 of the connector 101 may provide a degree of frictional force against the second portion 105 of the support bracket 102 such that an application of user-force is required to snap the ridge 111 over the second portion 105 to fully set the second portion 105 within the connector 101 thereby retaining the support bracket 102 within the connector 101.

Figure 5:
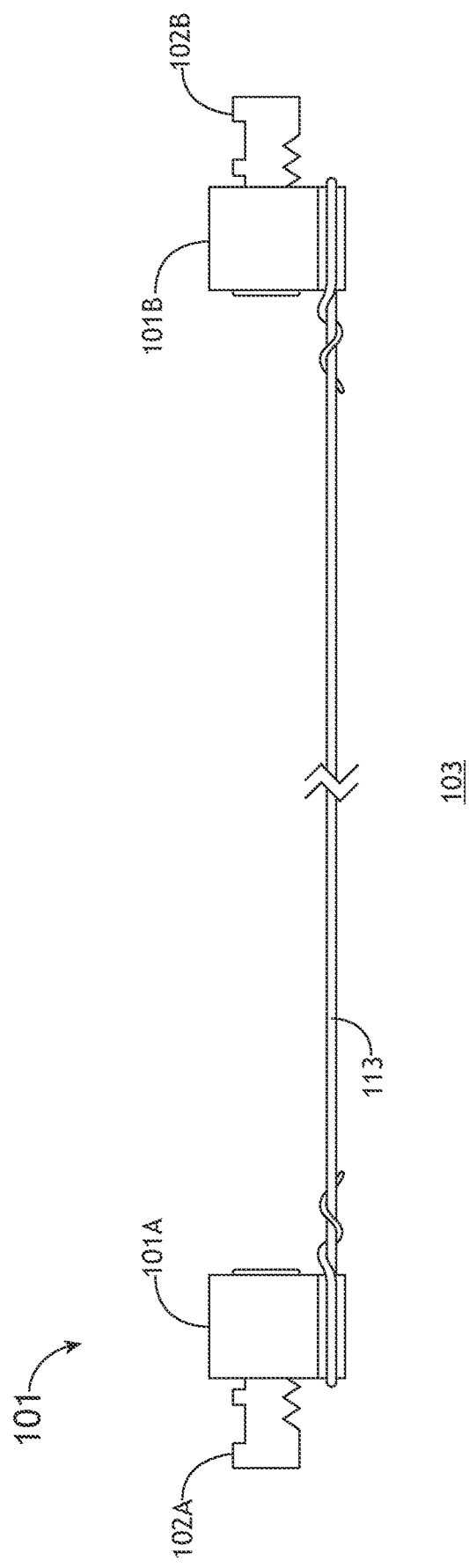
FIG. 5 shows a system for suspending articles from a surface.

Referring to FIG. 5, the system 100 may include a first connector 101A and a second connector 101B. A common line 113 may be coupled to both the first connector 101A and the second connector 101B. The first connector 101A may be coupled to a first support bracket 102A and the second connector 101B may be coupled to a second support bracket 102B. A midpoint of the line 113 may then be disposed over an anchor point (e.g. a wall anchor, nail, screw, and the like) on a surface (e.g. a wall) from which an article defining the surface 103 is to be suspended. Such a configuration simplifies the process of suspending the article from a single anchor point as opposed to multiple anchor points (which may require leveling) needed to suspend the article from the first support bracket 102A and the second support bracket 102B.

Figure 6:
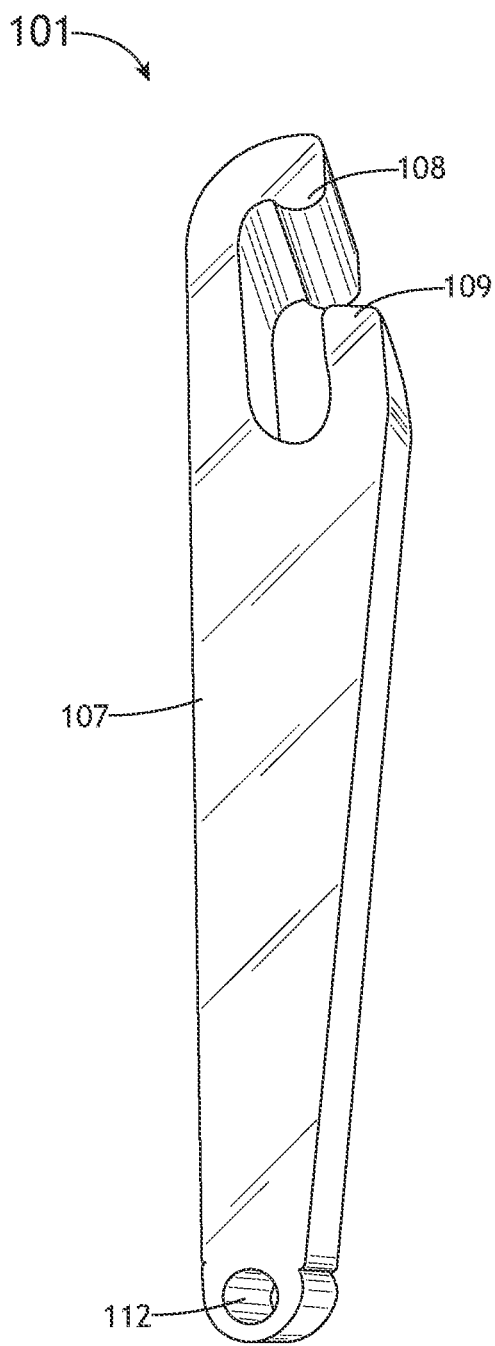
FIG. 6 shows a connector for suspending articles from a surface.

Referring to FIG. 6, a connector 101 may have any number of form factors. For example, the connector 101 may have an elongate body portion 107 where the first curved portion 108 and the second curved portion 109 are disposed at a first end of the elongate body portion 107 and the line retention portion 112 is disposed at a second end of the elongate body portion 107.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A system including:
    a line;
    at least one connector including:
        a body portion;
        a first curved portion extending from a top end of the body portion;
        a ridge portion extending at an angle from the first curved portion;
        a second curved portion extending from a bottom end of the body portion;
        a line-retention portion coupled to the body portion and configured to couple to the line; and
    a support bracket including:
        a first portion configured to extend at least partially away from an object coupled to the support bracket;
        a second portion disposed at an angle relative to the first portion,
    wherein the first portion and second portion of the support bracket form a free space between second portion and the object coupled to the support bracket, and
    wherein the ridge portion and the second curved portion are configured to extend into the free space when the at least one connector is coupled to the support bracket.

2. The system of claim 1, wherein the first curved portion and the second curved portion are separated by an opening.

3. The system of claim 1, wherein the line-retention portion of the at least one connector includes:
    a line-retention portion defining a tubular structure.

4. The system of claim 1, wherein the at least one connector is configured to engage the second portion of the support bracket.

5. The system of claim 4, wherein at least a portion of the at least one connector is configured to engage both a front surface and a back surface of the support bracket.

6. The system of claim 1, wherein the ridge is configured to engage a least a portion of a back surface of the second portion of the support bracket.

* * * * *